H. T. HERR.
PRESSURE EQUALIZING MECHANISM.
APPLICATION FILED JULY 6, 1911.
1,185,415.
Patented May 30, 1916.
2 SHEETS—SHEET 2.
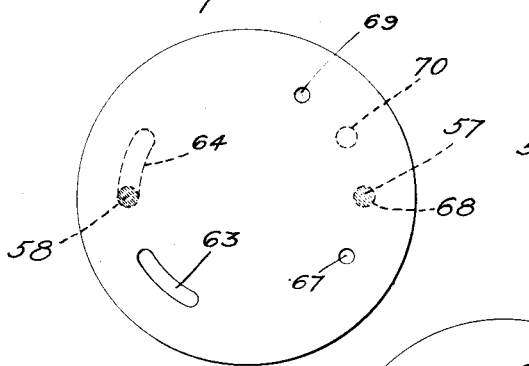
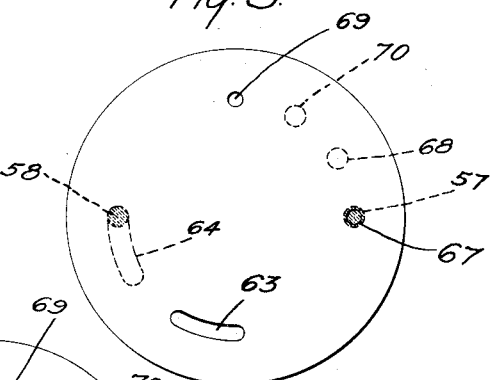
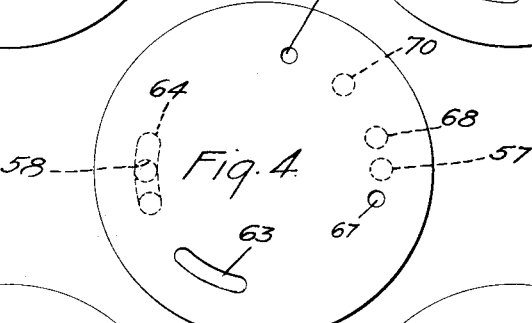
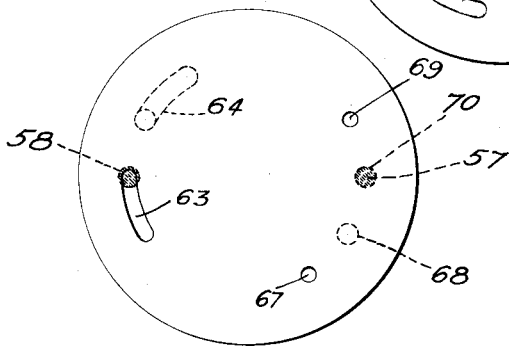
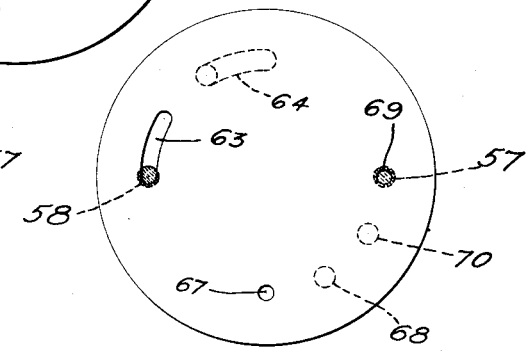
WITNESSES:
INVENTOR.
Herbert T. Herr
BY
HIS ATTORNEY IN FACT.

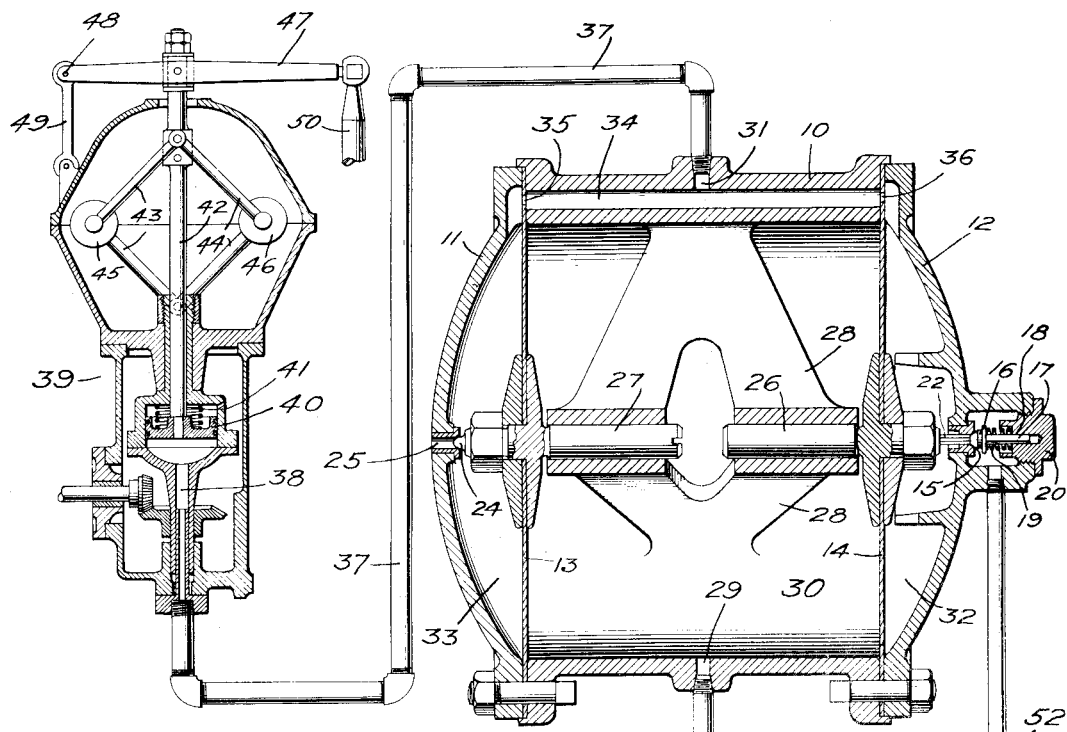

UNITED STATES PATENT OFFICE.

HERBERT T. HERR, OF PITTSBURGH, PENNSYLVANIA, ASSIGNOR, BY MESNE ASSIGNMENTS, TO THE WESTINGHOUSE MACHINE COMPANY, OF EAST PITTSBURGH, PENNSYLVANIA, A CORPORATION OF PENNSYLVANIA.

PRESSURE-EQUALIZING MECHANISM.

1,185,415.     Specification of Letters Patent.     Patented May 30, 1916.

Application filed July 6, 1911. Serial No. 637,101.

*To all whom it may concern:*

Be it known that I, HERBERT T. HERR, a citizen of the United States, and a resident of Pittsburgh, in the county of Allegheny and State of Pennsylvania, have made a new and useful Invention in Pressure-Equalizing Mechanism, of which the following is a specification.

This invention relates to a pressure distributing device and one of the objects is to provide means whereby a determined constant pressure will be exerted against a pressure actuated device affected by the distributer.

Another object is to provide means for controlling the distributer so that any given pressure may be maintained.

Another object is to provide a distributer having a self contained regulating means.

Other objects and advantages of this invention will be specifically described hereinafter, it being understood that changes in form, proportion and minor details of construction may be resorted to without departing from the spirit of the invention or sacrificing any of the advantages thereof.

Figure 1 is a sectional view through a distributer constructed in accordance with my invention, said distributer being shown as connected to a speed responsive device and to a controlling valve and a source of supply. Fig. 2 is a diagrammatic view of the controlling valve in the position which it will assume when the distributing device is exhausting, as shown in Fig. 1. Fig. 3 is a view of the valve in the position it will assume when the source of supply is connected to the distributing valve. Fig. 4 is a view of the valve showing the position it will assume when in lap position the supply to the distributing device being cut off. Fig. 5 is a view of the valve showing the position it will assume when the distributing device is exhausting and air is being admitted to a second pressure controlled mechanism, and Fig. 6 is a view of the valve in the position it will assume to admit air to the distributing device and the reversing mechanism.

Referring now to the drawings by numerals of reference; 10 indicates the casing having removable ends 11 and 12 between which and the ends of the intermediate portion of the casing 10 are secured diaphragms 13 and 14. One of the ends, in the present instance the one designated by the reference numeral 12, is provided with an inlet 15 adapted to be closed by a valve 16 having a stem 17 in guide 18 and adapted to be seated by a spring 19 surrounding the stem and having one end bearing against the cap 20 and the other against the valve. The stem 22 of the valve 16 may be unseated by the diaphragm 14 and seated by a spring 19. A diaphragm 13 carries a valve 24 adapted to close the outlet or exhaust 25 of the distributer and both diaphragms are provided with guides 26 and 27 respectively which are adapted to reciprocate in a spider 28. The distributer is provided with an inlet port 29 which admits pressure to the interior thereof between the two diaphragms 13 and 14.

By reference to Fig. 1 it will be observed that a pressure space or chamber 30 is provided by the intermediate portion of the case 10 and the diaphragms 13 and 14 which is entirely closed except for the port 29. The distributer is provided with a pressure outlet 31 which communicates with the end chambers 32 and 33 through a conduit 34 by means of openings 35 and 36 in the diaphragms 13 and 14 respectively. A pipe 37 is shown as leading from the outlet 31 to a cylinder 38 of a speed responsive device 39. Within the cylinder 38 is a piston 40 which bears against a spring 41, and which is connected to a spindle 42, the spindle 42 carrying weight arms 43 and 44 to which weights 45 and 46 are attached. The spindle 42 also extends through the governor case and carries a lever 47 fulcrumed at 48 to a link 49 and having its other end attached to a valve actuating rod 50 which may be connected to the throttle valve of the motor for example. A suitable source of supply as for example a reservoir 51, is connected to the inlet 15 of the distributer through a pipe 52. This reservoir is also connected to the inlet 29 through a valve 53 connected to the reservoir by a pipe 54 and to the distributer chamber 30 through a pipe 55. The valve casing is provided with an inlet 56, with an outlet 57 communicating with the pipe 55, and with an outlet 58 connecting with a pipe 59 leading to a suitable pressure actuating device, in the present instance a reversing valve 60 for a suitable motor; as for example, a marine turbine. The valve disk 61 will be maintained on its seat by the pressure from the pipe 54 and the valve 61 may be actuated by a hand lever 62. The valve disk is provided with two elongated ports 63 and 64; the port 63 being adapted to communicate with the pipe 59 over a relatively wide range of rotation of the valve 61 so as to supply pressure from the pipe 54 to the pipe 59 and actuate the reversing valve 60 in one direction. The port 64 is also adapted to communicate with the pipe 59 and with the exhaust chamber 65 and the exhaust port 66 so that when the elongated port 64 is in communication with the pipe 59, pressure will be exhausted from the pipe 59 through the exhaust 66. The disk is provided with an inlet port 67 which is adapted to establish communication between the chamber 30 and the reservoir 51 when the port 64 is in communication with the pipe 59 to exhaust it to atmosphere. The disk is also provided with an exhaust port 68 which is adapted to exhaust the chamber 30 through the pipe 55, to atmosphere by means of port 66.

69 is a port corresponding to the port 67 by coöperating with the port 63, so that when 63 is admitting pressure to the pipe 59 pressure from the reservoir may be permitted to pass through 69 and enter the chamber 30.

70 is a port for exhausting the pressure from the chamber 30 to atmosphere as explained in connection with port 68.

Assuming that all the parts are assembled and the distributing device is to be used in connection with a reversible motor to control the speed in either a forward or reverse direction or both, the operation will be as follows: If the hand lever for the valve is in a neutral position, as it would be in Fig. 4, and it is moved until the port 67 registers with the port 57, pressure will be admitted into the chamber 30 to expand the diaphragms 13 and 14 so as to close the port 25 and unseat the valve 16 so that pressure will be admitted into the end chamber of the distributing device and a determined pressure will be caused to be exerted against the piston 40 of the speed responsive governor. If it is desired to exert 10 pounds pressure against the piston 40 the ports 67 and 57 will be caused to register until the pressure gage 55ª, in communication with the pipe 55, registers approximately 10 pounds. The 10 pounds pressure in the chamber 30 will act against the diaphragm 14 to unseat the valve 16 and admit pressure from the pipe 52 until the pressures on each side of the diaphragm 14 equalize when the spring 19 will cause the valve 16 to be seated. So long as the pressure in the chamber 30 is equal to that in the chambers 32 and 33 the valve 24 will remain seated. If some of the pressure should leak through the governor mechanism the pressure within the chamber 30 will preponderate and cause the valve 16 to unseat until the pressure is restored through the pipe 52. As soon as the desired pressure is obtained within the chamber 30 the handle 62 is turned to lap position, so that the port 57 will be blanked, as clearly shown in Fig. 4. If it is desired to increase the pressure against the pressure actuated element, as for example, the piston 40, the ports 57 and 67 may again be caused to register until the pressure gage 55ª indicates that the desired pressure has been obtained within the chamber 30. It is to be remembered that the pressure within the cylinder 38 will determine the normal running speed of the motor to which the governor is attached. If it is desired to decrease the normal speed the handle 62 will be moved until the port 68 registers with the port 57, as shown in Figs. 1 and 2, so that some of the pressure may exhaust from the chamber 30, whereby the preponderance of pressure will be on the other side of the diaphragm causing the diaphragm 14 to move inwardly, thereby permitting the valve 16 to seat and the diaphragm 13 to unseat the valve 24 and thereby permit the excess pressure to exhaust through the port 25 until the pressures on opposite sides of the diaphragm approximately equalize when the port 25 will be closed and the port 15 will remain closed until the pressure falls below that in the chamber 30. Obviously as soon as sufficient pressure has been exhausted from the chamber 30, as will be indicated by the pressure gage 55ª, the port 57 may be blanked. If it is desired to reverse the motor the hand lever will be caused to rotate the disk 61 so that the elongated port 63 will communicate with the pipe 59 so that fluid under pressure will pass through the pipe 59 into the reversing valve casing 60 and reverse the motor in any well known manner. The movement of the disk 61 will have exhausted the pressure from the chamber 30 through the pipe 55 and the exhaust port 66. It will then be necessary to bring the port 69 in communication with the port 57 as shown in Fig. 6 to admit a pressure in the chamber 30 corresponding to the pressure required to maintain a given speed which will be indicated on the indicator 55ª, as heretofore described. The ports 69 and 57 will be caused to register until the required pressure is gained, when the port 57 will be blanked. If it is desired to reduce the speed of the motor the ports 70 and 57 may be caused to register so that some of the pressure may exhaust from the chamber 30 causing the valve 24 to be unseated and some of the pressure from the pipe 37 will escape to atmosphere.

When it is desired to again drive the motor forward the disk 61 may be rotated until the port 64 registers with the port 58 to permit the pressure to escape from the pipe 59 and a sufficient amount of pressure may be admitted into the chamber 30 from the reservoir 51 to affect the governor for the desired speed.

It is to be understood that while I have illustrated the distributing device as coöperating with the governor and a reversing valve, such combination need not necessarily follow because the distributing device may be used with any kind of a mechanism against which a determined pressure is to be maintained.

Having now described my invention what I claim is:

1. In combination in a device of the character described, a diaphragm actuated inlet valve, a diaphragm actuated exhaust valve, and means for subjecting the diaphragms of said valves to the same actuating pressure.

2. A pressure regulating device comprising a casing having an inlet port and an exhaust port, independent pressure responsive means for controlling the delivery of fluid through the ports, and manually controllable means for delivering variable determined actuating pressures to said pressure responsive means.

3. In combination in a pressure regulating device, a casing having a central chamber with flexible walls, port closing valves connected to said flexible walls and means for admitting pressure to said chamber.

4. In combination in a pressure distributing device, a casing having a central chamber and two end chambers, flexible walls separating the end chambers from the central chamber, means for admitting pressure to the two end chambers and connected to one of the flexible walls, means for exhausting pressure from the end chambers and connected to one of the flexible walls and means for admitting pressure to the central chamber.

5. In combination in a pressure distributer, a casing having two inlets and two outlets, flexible walls within the casing to provide a central chamber and two end chambers, the central chamber having a single inlet and no outlet, one of said outlets being open to communicate with a pressure actuated device and the other outlet being adapted to communicate with atmosphere, means on one of the flexible walls for admitting pressure to the end chambers to communicate with one of the outlets and means on the other flexible wall to open the atmosphere exhaust when the pressure in the end chamber preponderates over that in the central chamber.

6. The combination with a distributing device, a casing having a central chamber and two end chambers, a speed responsive governor having a piston and cylinder in communication with the end chambers, a reservoir, a valve in communication with the reservoir and the central chamber and a pressure responsive device adapted to communicate with the reservoir through the valve.

7. A pressure regulating device comprising a casing having a fluid inlet port, communicating with a source of fluid pressure, a fluid delivery port communicating with a pressure delivery passage and a fluid discharge port communicating with the atmosphere, all of said ports communicating with a chamber of the casing, a valve for controlling the discharge of fluid through the discharge port, a valve for controlling the delivery of fluid through the inlet port and separate pressure actuated means for controlling the operation of each valve, each of said means being subjected to the pressure within the chamber communicating with said ports and to the pressure within a pressure chamber of said casing.

8. A pressure regulating device comprising a casing having a fluid inlet port, communicating with a source of fluid pressure, a fluid delivery port communicating with a pressure delivery passage and a fluid discharge port communicating with the atmosphere, all of said ports communicating with a chamber of the casing, a valve for controlling the discharge of fluid through the discharge port, a valve for controlling the delivery of fluid through the inlet port, separate pressure actuated means for controlling the operation of said valves responsive to variations of pressure within the chamber communicating with said ports and to the pressure within a pressure chamber of said casing, and means for varying the degree of pressure within the pressure chamber.

9. A pressure regulating device comprising a casing having a fluid inlet port, communicating with a source of fluid pressure, a fluid delivery port communicating with a pressure delivery passage and a fluid discharge port communicating with the atmosphere, all of said ports communicating with a chamber of the casing, a valve for controlling the discharge of fluid through the discharge port, a valve for controlling the delivery of fluid to the inlet port, a separate diaphragm within said casing for actuating each valve and so located as to form a pressure chamber within the casing, each diaphragm being subjected on one side to the pressure within the pressure chamber, and on the other to the pressure within the chamber communicating with said ports, and means for delivering varying degrees of fluid pressure to said pressure chamber.

10. A pressure regulating device comprising a casing having a pressure chamber with flexible walls, a separate port closing valve actuated by each flexible wall for controlling the delivery of fluid to and the discharge of fluid from a second chamber of the casing, and means for admitting varying degrees of fluid pressure to said pressure chamber.

11. A pressure regulating device for delivering regulable fluid pressure, comprising a pressure delivery chamber in open communication with a pressure supply passage, independent valves for controlling the delivery of fluid to and the discharge of fluid from said chamber, separate pressure responsive means for controlling the operation of each valve, and manually operated means for delivering regulable degrees of actuating pressure to said pressure responsive means.

12. A pressure regulating device for delivering regulable pressure comprising a casing having a chamber in open communication with a pressure delivering passage and controlling mechanisms for controlling the degree of pressure within said chamber consisting of pressure responsive means for controlling the delivery of fluid under pressure to said chamber, separate pressure responsive means for controlling the discharge of fluid from said chamber, and a manually controlled valve for delivering variable degrees of actuating fluid pressure to said pressure responsive means.

13. A pressure regulating device comprising a casing having a pressure chamber with flexible walls and a pressure delivery chamber formed therein provided with a fluid delivery port, a fluid inlet port and a fluid discharge port, a valve for controlling the delivery of fluid through the inlet port and actuated by one of the flexible walls of the pressure chamber, a valve for controlling the discharge of fluid through the discharge port and actuated by the other flexible wall of the pressure chamber, and means for delivering fluid under pressure to and for delivering fluid from said pressure chamber.

14. A pressure regulating device for delivering regulable fluid pressure, comprising a pressure delivery chamber in open communication with a pressure delivery passage through which the regulable pressure is delivered, separate valves for controlling the delivery of fluid to and the discharge of fluid from said chamber, a second chamber included in said device, oppositely disposed flexible diaphragms forming walls for said second chamber and both exposed to the pressure within said second chamber, means actuated by said diaphragms for controlling the operation of said valves, and means for delivering varying degrees of regulating pressure to said second chamber.

15. A pressure regulating device for delivering regulable fluid pressure, comprising a pressure delivery chamber in open communication with a pressure delivery passage through which the regulable pressure is delivered, separate valves for controlling the delivery of fluid to and the discharge of fluid from said chamber, a second chamber included in said device, oppositely disposed flexible diaphragms forming walls for said second chamber and both exposed to the pressure within said second chamber, means actuated by said diaphragms for controlling the operation of said valves, means for delivering varying degrees of regulating pressure to said second chamber, a speed responsive governor, and a fluid pressure actuated controlling means for controlling the operation of the governor and receiving actuating pressure from said pressure delivery passage.

In testimony whereof, I have hereunto subscribed my name this 22nd day of June, 1911.

HERBERT T. HERR.

Witnesses:
C. W. McGHEE,
R. J. RIDGE.